(12) United States Patent
Kelley et al.

(10) Patent No.: US 6,847,515 B1
(45) Date of Patent: Jan. 25, 2005

(54) POWER SUPPLY SYSTEMS AND METHODS THAT CAN ENABLE AN ELECTROMAGNETIC DEVICE TO RIDE-THROUGH VARIATIONS IN A SUPPLY VOLTAGE

(75) Inventors: Arthur Kelley, Raleigh, NC (US);
John Ledford, Kansas City, MO (US);
Luca Vassalli, Santa Clara, CA (US);
John Cavaroc, Garner, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 09/301,841

(22) Filed: Apr. 29, 1999

(51) Int. Cl.[7] .................................................. H01H 9/00
(52) U.S. Cl. ........................ 361/160; 361/93.1; 361/115
(58) Field of Search ........................... 361/18, 115, 160, 361/170, 93.1, 154, 159

(56) References Cited

U.S. PATENT DOCUMENTS

| | | | |
|---|---|---|---|
| 4,223,289 A | | 9/1980 | Immel ........................ 335/202 |
| 4,274,122 A | * | 6/1981 | Hansen et al. .............. 361/159 |
| 4,544,987 A | | 10/1985 | Loring ........................ 361/194 |
| 5,406,440 A | * | 4/1995 | Wieloch ...................... 361/154 |
| 5,734,543 A | | 3/1998 | Turner ........................ 361/154 |

OTHER PUBLICATIONS

International Search Report, PCT/US00/11738, Sep. 20, 2000.

McGranaghan et al. "Voltage Sags in Industrial Systems," 1991 IEEE, pp. 18–24.

David et al., "Voltage Sags: Their Impact on the Utility and Industrial Customers," 1996 IEEE, pp. 65–73.

Gurlaskie et al. "Analysis of Voltage Sags on Distribution Systems–Parts 1 and 2," *Power Quality Solutions/Alternative Energy Proceedings.* Sep. 1996, pp. 45–72.

* cited by examiner

Primary Examiner—Stephen W. Jackson
(74) Attorney, Agent, or Firm—Myers Bigel Sibley & Sajovec

(57) ABSTRACT

Power supply systems and methods can enable an electromagnetic device, such as an electrical contactor, to ride-through both voltage sags and dropouts. In an illustrative embodiment, a rectifier is used to generate a DC input voltage from an AC supply voltage. An interface circuit supplies the DC input voltage to an electrical contactor to provide the necessary power for operating the contactor. In general, an electrical contactor that is intended to operate from an AC voltage will operate equally well from a lower magnitude DC voltage. The interface circuit uses this difference in magnitudes between the AC voltage source and an operationally equivalent DC voltage source to maintain the DC input voltage at a desired level even if the AC voltage source sags below its normal operating level. In addition, an energy storage device may be used to store at least some of the DC input voltage. When a sag or dropout occurs in the AC voltage source, the interface circuit is able to maintain the operation of the electrical contactor for a period of time by using the stored DC input voltage as a power source. The energy storage device thus provides a power reservoir that can be accessed during severe voltage sags or even dropouts to ensure continuous operation of the electrical contactor.

28 Claims, 9 Drawing Sheets

POWER SUPPLY SYSTEMS AND METHODS THAT CAN ENABLE AN ELECTROMAGNETIC DEVICE TO RIDE-THROUGH VARIATIONS IN A SUPPLY VOLTAGE

FIELD OF THE INVENTION

The present invention relates generally to the field of power supply systems, and, more particularly, to systems and methods that can improve the response of electrical contactor power supply systems to variations in a supply voltage, such as voltage sags and voltage dropouts.

BACKGROUND OF THE INVENTION

Power line disturbances can produce serious problems for continuous process industries. In particular, voltage sags and dropouts can be some of the most troublesome events. Events lasting less than one-half second can shut down a facility and halt production for several hours, which can result in a substantial cost to the manufacturer due to loss of product. Industrial equipment reacts to voltage sags in a variety of ways. In some cases, the best solution may be to protect the entire facility from the voltage sag with a device such as a dynamic voltage restorer. In other cases, it may be more economical to identify particularly susceptible components and protect them alone.

Electrical contactors are often used as a safety device in industrial settings to provide a switch between a machine and the power supply that drives the machine. A typical electrical contactor is a form of a solenoid switch that can be used to connect and disconnect electrical circuits to and from each other. In particular, an electrical contactor is operated by applying an electric potential to an electromagnetic coil, which generates a current flow in the coil that induces a magnetic field to close two or more electrical contacts typically held open via a spring. When the electric potential is removed from the coil, the magnetic field that holds the electrical contacts closed is removed allowing the contacts to spring under tension from the spring. Many production facilities use electrical contactors to control one or more motors. While the motors often have enough inertia to ride-through power line disturbances, contactors may be particularly susceptible to voltage sags. For example, "[o]ne manufacturer has provided data that indicates their line of motor contactors will drop out at 50% voltage if the condition lasts for longer than one cycle. This data should be expected to vary among manufacturers, and some contactors can drop out at 70% normal voltage or even higher." (McGranaghan et al., "Voltage Sags in Industrial Plants," IEEE Transactions on Industry Applications, Vol. 29, no. 2, March/April, 1993, quoting M. Sauter, "Voltage fluctuations on Power Systems," Westinghouse Electric Utility Engineering Reference Book, Distribution Systems, p. 362, 1965).

One approach to addressing the problem of contactor dropout is described in U.S. Pat. No. 5,734,543 to Turner (hereinafter the '543 patent). The '543 patent describes "a mechanism for improving the performance of a solenoid device during a lapse in power quality to the solenoid device from an alternating current (AC) power source. The mechanism comprises a wave shaping device configured to introduce a direct current (DC) component to an alternating current signal provided by the alternating current power source and to output at least part of the alternating current signal modified by the direct current component to the solenoid device." (The '543 patent at col. 1, line 65 through col. 2, line 6).

Moreover, the mechanism described in the '543 patent is designed to "provide an AC electrical contactor having improved voltage sag ride through capability." (The '543 patent at col. 1, lines 62–64). Unfortunately, the '543 patent does not address the problem of electrical contactor ride-through in response to a complete dropout of the AC power source (i.e., the AC power source voltage falls to zero for a fraction of a cycle or longer).

Consequently, there is a need for power supply systems and methods that can improve the ride-through capability of an electromagnetic device, such as an electrical contactor, particularly under voltage dropout conditions.

SUMMARY OF THE INVENTION

It is therefore an object of the present invention to provide power supply systems and methods that can improve the ride-through capability of an electromagnetic device.

It is another object of the present invention to provide power supply systems and methods that can allow an electromagnetic device, such as an electrical contactor, to ride-through a voltage dropout.

These and other objects, advantages, and features of the present invention are provided by power supply systems and methods that can enable an electromagnetic device, such as an electrical contactor, to ride-through both voltage sags and dropouts by converting an AC supply voltage to a DC input voltage. The DC input voltage is supplied to an electromagnetic device to operate the electromagnetic device therefrom. By converting the AC supply voltage to a DC input voltage and using the DC input voltage to energize an electromagnetic device, the electromagnetic device can withstand or ride-through lapses in the AC supply voltage.

In an illustrative embodiment of the present invention, a rectifier is used to generate a DC input voltage from an AC supply voltage. An interface circuit supplies the DC input voltage to an electrical contactor to provide the necessary power for operating the contactor. An electrical contactor that is intended to operate from an AC voltage typically operates equally well from a lower magnitude DC voltage. The interface circuit uses this difference in magnitudes between the AC voltage source and an operationally equivalent DC voltage source to maintain the DC input voltage at a desired level even if the AC voltage source sags below its normal operating level.

In accordance with an aspect of the invention, an energy storage device is used to store at least some of the DC input voltage. When a sag or dropout occurs in the AC voltage source, the interface circuit is able to maintain the operation of the electrical contactor for a period of time by using the stored DC input voltage as a power source. The energy storage device thus provides a power reservoir that can be accessed during severe voltage sags or even dropouts to ensure continuous operation of the electrical contactor. In a preferred embodiment of the invention, the energy storage device is a capacitor.

In accordance with another aspect of the invention, the interface circuit includes a timer that generates a periodic control signal, which is related to the magnitude of the DC input voltage. The periodic control signal is used to operate a switch that electrically connects the DC input voltage to the electrical contactor. In particular, the control signal causes the switch to connect the DC input voltage to the electrical contactor for a period of time that is inversely proportional to the magnitude of the DC input voltage.

Accordingly, the power supply systems and methods in accordance with the present invention can be useful in protecting critical equipment in continuous process industries from voltage sags and dropouts, which have the potential to be costly events in terms of both product loss and/or production downtime.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1A:
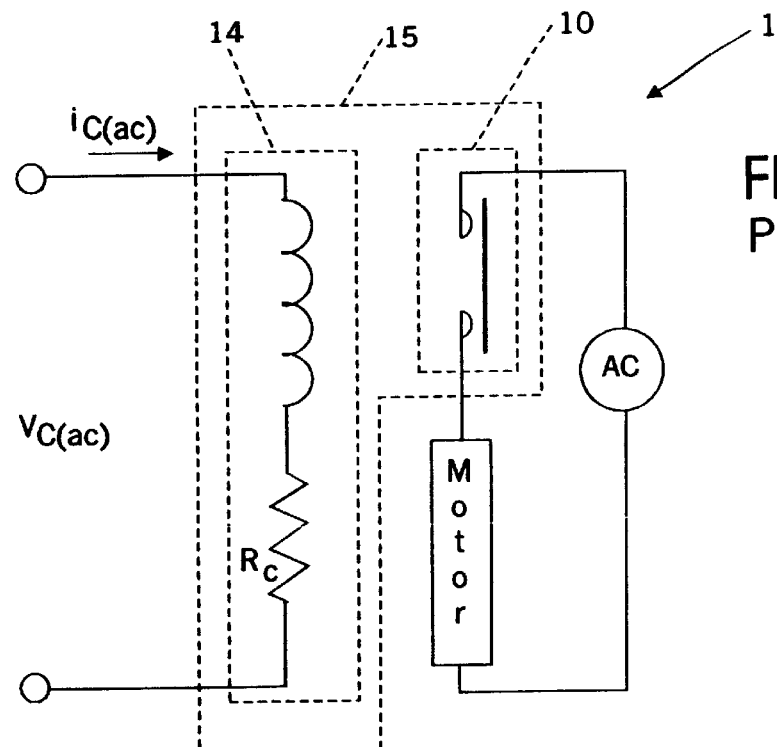
FIG. 1A illustrates a conventional electrical contactor power supply system powered by an AC supply voltage.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

With reference to FIG. 1A, a conventional electrical contactor power supply system 12 includes a contactor 15 that comprises a contactor coil 14, which is represented as an inductor L in series with a resistor $R_c$, and contacts 16. The contactor coil 14 is powered from an AC voltage source that generates an AC supply voltage $v_{C(ac)}$, which has a root mean square (RMS) value denoted by $V_{C(ac)}$, and a frequency $f_{ac}=1/T_{ac}$, where $T_{ac}$ is the period of one cycle of the AC supply voltage. The contactor coil 14 draws an AC current $i_{C(ac)}$, which has a RMS value denoted by $I_{C(ac)}$.

When current is drawn through the inductor L, a magnetic force is induced that causes the contacts 16 to close thereby connecting the AC power source to the motor or machine. For purposes of illustration, only one set of contacts 16 is shown. It is not uncommon, however, to use multiple sets of contacts 16 to control a motor. For example, a three-phase motor may use three sets of contacts 16.

Figure 1B:
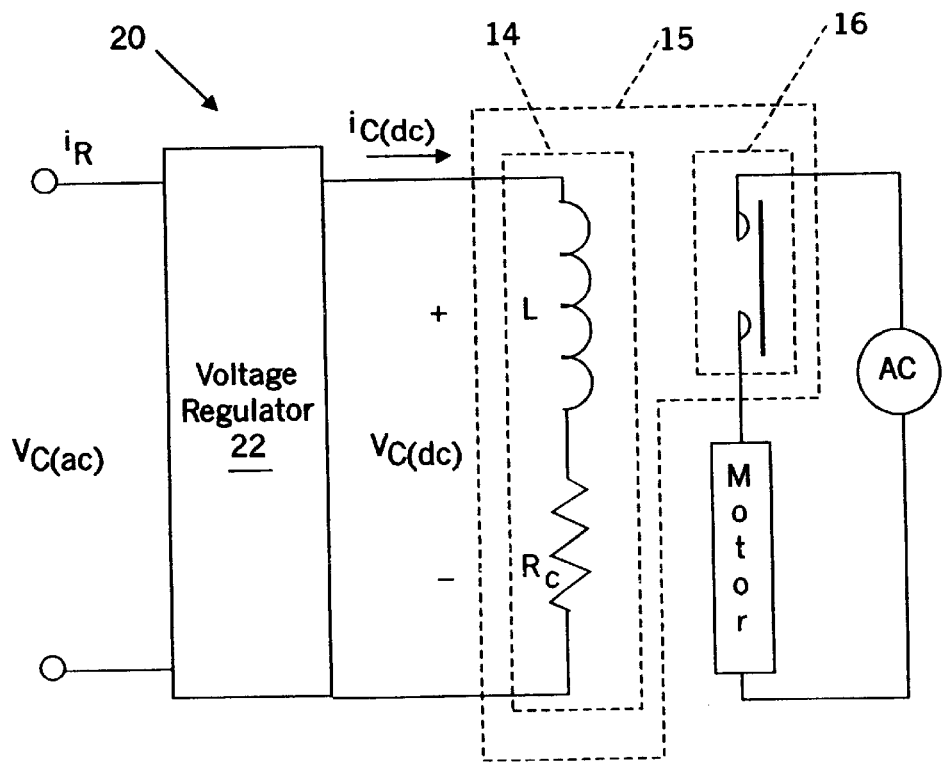
FIG. 1B illustrates electrical contactor power supply systems and methods in accordance with the present invention powered by an AC supply voltage.

FIG. 1B illustrates electrical contactor power supply systems and methods 20 in accordance with the present invention. The electrical contactor power supply 20 is similar to that illustrated in FIG. 1A, but further includes a voltage regulator 22 that provides an interface between the AC supply voltage $v_{C(ac)}$ and the contactor coil 14. The voltage regulator 22 draws a current $i_R$ from the AC supply voltage source and generates a DC voltage $v_{C(dc)}$ having an average value denoted by $V_{C(dc)}$ that is applied to the contactor coil 14. The contactor coil 14 draws a DC current $i_{C(dc)}$, which has an average value denoted by $I_{C(dc)}$. Start and stop switches for the electrical contactor power supply system 20 may be incorporated into the AC supply voltage source $v_{C(ac)}$.

Figure 1C:
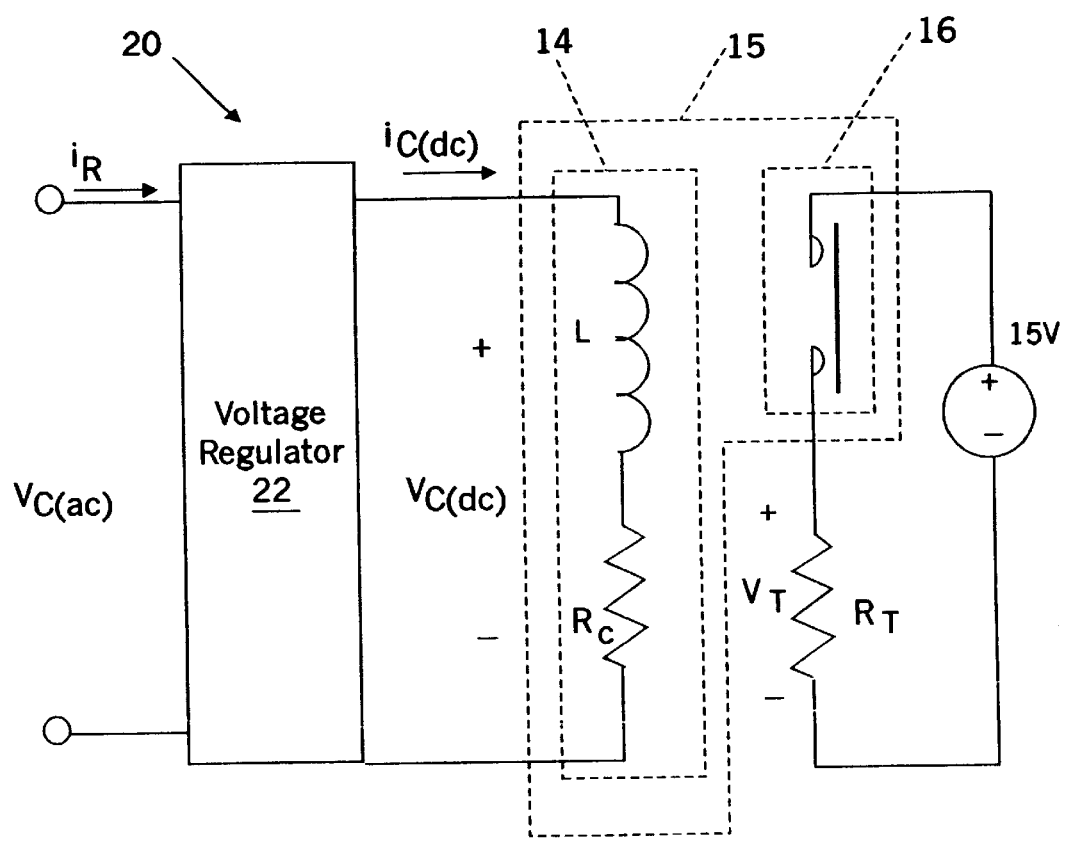
FIG. 1C illustrates a configuration for testing electrical power supply systems and methods of FIG. 1B.

FIG. 1C illustrates a laboratory configuration for testing the electrical contactor power supply systems and methods 20 of FIG. 1B. In particular, a resistor $R_T$ and a 15V DC power supply are wired to the contacts 16 to generate a test signal $v_T$ that indicates whether the contacts 16 are open or closed. The test results for this configuration are discussed in detail hereinafter.

It will be understood that while the principles and concepts of the present invention are described herein in connection with an electrical contactor 15, the present invention is generally applicable to electromagnetic devices whose operation involves the use of electromagnetic force.

The use of the voltage regulator 22 in the electrical contactor power supply system 20 is based on a recognition that electrical contact terminals or electrical contactors that are intended to operate from an AC voltage will typically operate equally well from a lower magnitude DC voltage. This recognition is examined in more detail hereafter.

When operated from an AC supply voltage source, as shown in FIG. 1A, the contactor coil 14 current $i_{C(ac)}$ can be determined using only $v_{C(ac)}$ and $(2\pi f_{ac})L$ because $2\pi f_{ac}L >> R_C$. The RMS value of the contactor coil 14 current $I_{C(ac)}$ is therefore given by Equation 1:

$$I_{C(ac)} = \frac{V_{C(ac)}}{\sqrt{[(2\pi f_{ac})L]^2 + R_C^2}} = \frac{V_{C(ac)}}{(2\pi f_{ac})L} \quad \text{EQ. 1}$$

The time waveform for the contactor coil 14 current $i_{C(ac)}$ is given by Equation 2:

$$i_{C(ac)} = \sqrt{2} I_{C(ac)} \sin(2\pi f_{ac})t \quad \text{EQ. 2}$$

The contactor coil 14 current $i_{C(ac)}$ exerts a time-varying, pulsating force on the contactor 15 armature that depends on the current amplitude, but not on its polarity. The armature has sufficient inertia so that the contacts 16 remain closed even as the current goes through zero twice each cycle. The average force exerted by the AC current is proportional to the average current in a half-cycle, which is expressed below as Equation 3:

$$I_{C(h-c-avg)} = \frac{1}{\frac{T_{ac}}{2}} \int_0^{\frac{T_{ac}}{2}} |i_{C(ac)}| dt = \frac{2\sqrt{2}}{\pi} I_{C(ac)} \quad \text{EQ. 3}$$

Substituting the expression from Equation 1 for the contactor coil 14 current $I_{C(ac)}$ into Equation 3 allows the average current in a half-cycle to be expressed in terms of the AC supply voltage $v_{C(ac)}$ and frequency $f_{Fac}$ as set forth in Equation 4:

$$I_{C(h-c-avg)} = \frac{2\sqrt{2}}{\pi} \frac{V_{C(ac)}}{(2\pi f_{ac})L} = \frac{\sqrt{2} V_{C(ac)}}{\pi^2 f_{ac} L} \quad \text{EQ. 4}$$

Referring now to FIG. 1B, when the contactor coil 14 is operated from a DC voltage $v_{C(dc)}$ having an average value $V_{C(dc)}$, the impedance provided by the inductor L falls to zero (i.e., $(2\pi f_{ac})L=0$). Accordingly, the average DC current $I_{C(dc)}$ in the contactor coil 14 is given by Equation 5:

$$I_{C(dc)} = \frac{V_{C(dc)}}{R_C} \quad \text{EQ. 5}$$

The DC current $I_{C(dc)}$ exerts a constant force on the contacts 16 through the armature. Therefore, to ensure that the DC current $I_{C(dc)}$ achieves the same average force on the contactor 15 armature as provided by the AC current $I_{C(ac)}$, Equations 4 and 5 are equated to obtain a ratio of the DC voltage $V_{C(dc)}$ to the AC voltage $V_{C(ac)}$ in Equation 6:

$$\frac{V_{C(dc)}}{V_{C(ac)}} = \frac{\sqrt{2} R_C}{\pi^2 f_{ac} L} \quad \text{EQ. 6}$$

For many contactors, $V_{C(dc)}$ is approximately 10% of $V_{C(ac)}$. For example, a contactor with a nominal 120V AC coil typically operates equally well from a 12V DC source. The voltage regulator 22 can use this difference between the available AC supply voltage and the operationally equivalent DC contactor coil voltage to maintain the contactor coil current even when the AC supply voltage drops.

Figure 2:
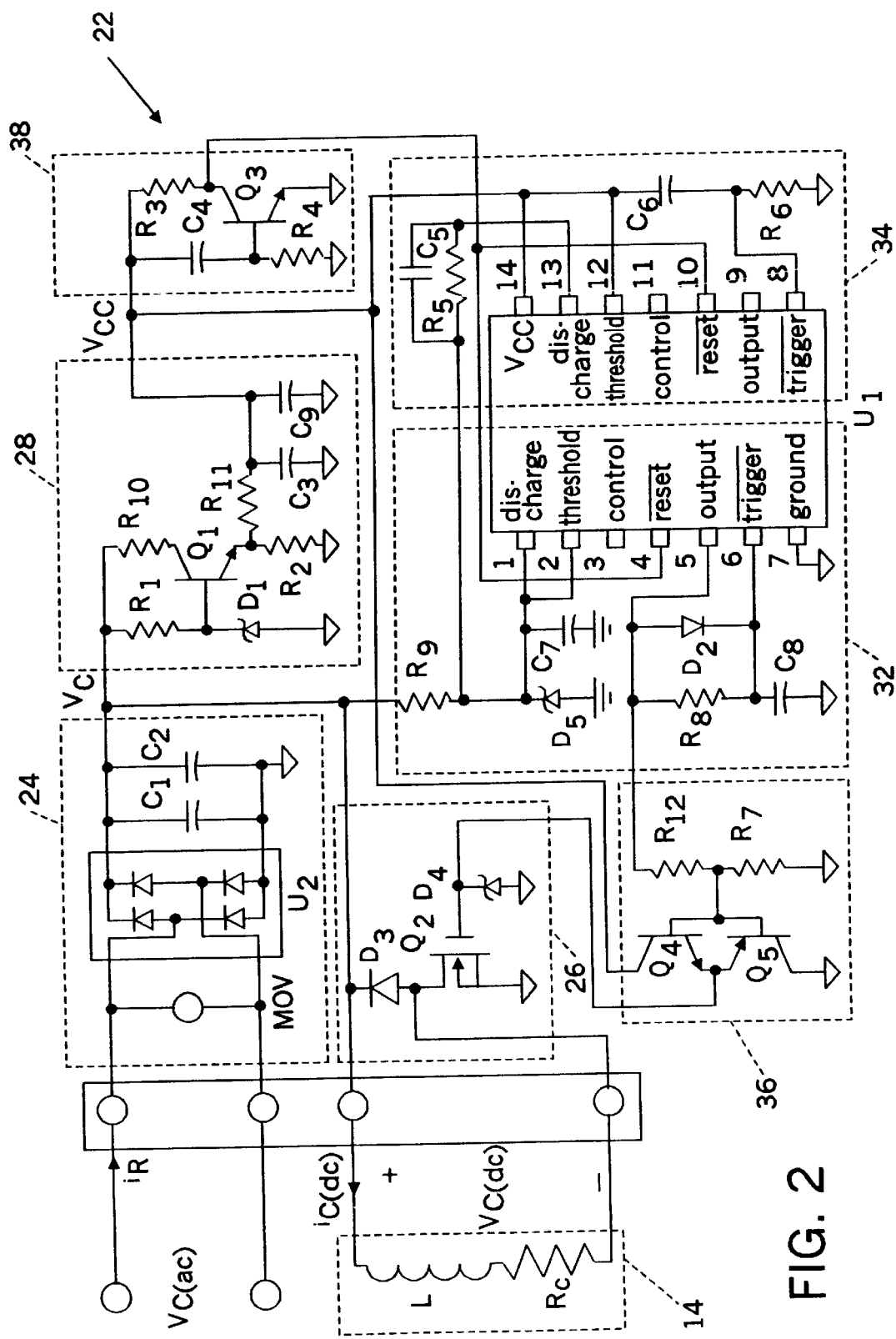
FIG. 2 is a detailed circuit schematic of a voltage regulator that can be used in FIG. 1B.

Referring now to FIG. 2, the voltage regulator 22 preferably comprises several functional blocks including a rectifier circuit with energy storage 24, a switch circuit 26, an internal power supply circuit 28, a timer circuit that comprises a constant off-time control circuit 32 and a pull-in control circuit 34, a gate driver circuit 36, and a power up delay circuit 38. Each of these functional blocks will be discussed in detail hereinafter.

Rectifier Circuit with Energy Storage

As shown in FIG. 2, the rectifier circuit 24 preferably comprises a full-wave bridge rectifier $U_2$ that converts the AC supply voltage $v_{C(ac)}$ to a relatively ripple free DC input voltage $v_O$ that has an average value $V_o$ approximately equal to the peak value of $v_{C(ac)}$. The average value of the DC input voltage $V_o$ can also be expressed in terms of the RMS value of the AC supply voltage as set forth in Equation 7:

$$V_o = \sqrt{2} V_{C(ac)} \quad \text{EQ. 7}$$

For $V_{C(ac)}$ values of 120V, 240V, and 480V, $V_O$ is approximately 170V, 340V and 680V, respectively. An electrolytic capacitor $C_1$ is connected to the DC input voltage $V_o$ and is used to store the energy that may be used to keep the contacts 16 closed during power line sags and dropouts. The value of capacitor $C_1$ generally determines the length of time during which the contactor coil 14 current $i_{C(dc)}$ is maintained during a complete dropout of the AC supply voltage $v_{C(ac)}$. Because contactor coils generally require very little energy, the value of capacitor $C_1$ is typically small. As shown in FIG. 2, a small ceramic capacitor $C_2$ is arranged in parallel with capacitor $C_1$ and is preferably used for high-frequency bypass. A metal-oxide varistor (MOV) is connected across the input terminals to the full-wave bridge rectifier $U_2$ to prevent transient surges in the AC supply voltage source from damaging the voltage regulator 22. It should be understood that while a capacitor is used as an energy storage means in a preferred embodiment of the present invention, other forms of energy storage, such as a battery, inductor, or other suitable energy storage circuit or device could also be used.

Switch Circuit

The switch circuit 26 preferably includes a power switch transistor $Q_2$ and a diode $D_3$, which form a buck converter (also called a chopper) that reduces the relatively high DC input voltage $v_O$ to the lower DC voltage $V_{C(dc)}$ used to energize the contactor coil 14. Transistor $Q_2$ comprises a metal-oxide-semiconductor field-effect transistor (MOSFET) in an exemplary embodiment of the present invention. Nevertheless, transistor $Q_2$ may also be implemented using a bipolar junction transistor (BJT) or an insulated gate bipolar transistor (IGBT). Zener diode $D_4$ acts as a clamp to protect the relatively fragile gate-to-source oxide of transistor $Q_2$ from damage due to overvoltage. Transistor $Q_2$ operates as a switch that is represented by an on-time $T_{ON}$ and an off-time $T_{OFF}$. During the on-time $T_{ON}$, transistor $Q_2$ effectively connects the DC input voltage $v_O$ to the contactor coil 14 and conducts the contactor coil 14 current $i_{C(dc)}$ through its drain terminal. Conversely, during the off-time $T_{OFF}$, transistor $Q_2$ effectively disconnects the DC input voltage $v_O$ from the contactor coil 14. Inasmuch as the contactor coil 14 current $i_{C(dc)}$ does not drop instantaneously to zero when transistor $Q_2$ turns off, a "flyback" diode $D_3$ is used to conduct the contactor coil 14 current $i_{C(dc)}$ during the $T_{OFF}$ interval until the current is dissipated through the resistor $R_C$. Transistor $Q_2$ operates with a period $T_S$ given by Equation 8:

$$T_S = T_{ON} + T_{OFF} 1/f_S \quad \text{EQ. 8}$$

Preferably, a value for $f_S$ is chosen that is above the normal range of human hearing. The duty cycle d of transistor $Q_2$ is given by Equation 9:

$$d = \frac{T_{ON}}{T_S} \quad \text{EQ. 9}$$

While the time waveform of the voltage $v_{C(dc)}$ applied to the contactor coil 14 switches between almost $v_O$ during $T_{ON}$ and almost zero during $T_{OFF}$, the average voltage $V_{C(dc)}$ applied to the contactor coil 14 is given by Equation 10:

$$V_{C(dc)} = dV_O \quad \text{EQ. 10}$$

For example, from an AC supply voltage $V_{C(ac)}$ of 120V (RMS), the rectifier circuit 24 may generate an average DC input voltage $V_O$ of 170 V. Thus, a duty cycle d of 0.07 results in a contactor coil 14 voltage $V_{C(dc)}$ of 12V. As will be explained in detail hereinafter, when the AC supply voltage $v_{C(ac)}$ and consequently the DC input voltage $v_O$ drop during a power line sag or dropout, the voltage regulator 22 operates to increase the duty cycle d to a value necessary to maintain the contactor coil 14 voltage $V_{C(dc)}$.

The voltage regulator 22 is able to maintain the contactor coil 14 voltage $V_{C(dc)}$ until the DC input voltage $V_O$ drops to a level at which the duty cycle d equals one. Beyond this point, the contactor coil 14 voltage $V_{C(dc)}$ is no longer maintained by the voltage regulator 22 and the contacts 16 open or drop out.

Internal Power Supply Circuit

The internal power supply circuit 28 generates an internal power supply voltage $V_{CC}$ of approximately 15V from the DC input voltage $v_O$. The internal power supply voltage $V_{CC}$ is used to power the constant off-time control circuit 32, the pull-in control circuit 34, the gate driver circuit 36, and the power up delay circuit 38. Transistor $Q_1$ and resistor $R_{10}$ are a linear series pass voltage regulator that use resistor $R_1$ and Zener diode $D_1$ as a reference to regulate the voltage at the base of transistor $Q_1$. Resistor $R_2$ ensures proper operation of the internal power supply circuit 28 by drawing a minimum load current. Resistor $R_{11}$ and capacitors $C_3$ and $C_9$ provide ripple filtering and bypass for the internal power supply voltage $V_{CC}$.

Constant Off-Time Control Circuit

The constant off-time control circuit 32 and the pull-in control circuit 34 each occupy one half of the dual timer integrated circuit $U_1$ as shown in FIG. 2. As used herein, a "high" voltage or signal means that the voltage or signal is approximately equal to the internal power supply voltage $V_{CC}$. Similarly, a "low" voltage or signal means that the voltage or signal is approximately zero volts. In a preferred embodiment, the dual timer $U_1$ is a conventional type 555 timer integrated circuit.

The constant off-time control circuit 32 is used to adjust the duty cycle d of the transistor $Q_2$. The constant off-time control circuit 32 does this by setting $T_{OFF}$ to a constant value and making $T_{ON}$ inversely proportional to the DC input voltage $V_O$. Therefore, as the DC input voltage $V_O$ drops due to a power line sag or dropout, the duty cycle d is increased to keep the contactor coil 14 voltage $V_{C(dc)}$ constant.

With reference to FIG. 2, pin 5 of the dual timer $U_1$ drives a control signal that determines whether transistor $Q_2$ is turned on or turned off. When the control signal from pin 5 is pulled low, transistor $Q_2$ is turned off. The time duration $T_{OFF}$ that transistor $Q_2$ remains in the off state is determined by the time constant of capacitor $C_8$ and resistor $R_8$. During the $T_{OFF}$ interval, capacitor $C_8$ is discharged through $R_8$ into pin 5. The voltage developed across capacitor $C_8$ appears at pin 6, which serves as a trigger input to the dual timer $U_1$. When the voltage across capacitor $C_8$ falls below one-third of the internal power supply voltage $V_{CC}$, pin 5 is driven high, which terminates the $T_{OFF}$ interval. Diode $D_2$ ensures that capacitor $C_8$ quickly recharges to $V_{CC}$ in anticipation of the next $T_{OFF}$ interval by providing a bypass to resistor $R_8$.

In a similar manner, the time duration $T_{ON}$ that transistor $Q_2$ remains in the on state is determined by the time constant of resistor $R_9$ and capacitor $C_7$. The voltage developed across capacitor $C_7$ appears at pin 2, which serves as a threshold signal to terminate the $T_{ON}$ interval by pulling pin 5 low when capacitor $C_7$ charges beyond two-thirds of the internal power supply voltage $V_{CC}$. Instead of being charged from the constant internal power supply voltage $V_{CC}$, however, capacitor $C_7$ is charged from the DC input voltage $V_O$, which changes depending on the AC supply voltage $V_{C(ac)}$. Therefore, a drop in the DC input voltage $V_O$ due to a sag or dropout of the AC supply voltage $V_{C(ac)}$ means that the capacitor $C_7$ will charge more slowly, which results in a longer $T_{ON}$ interval.

This is an example of what is commonly known as "voltage feedforward." Note that there is no closed-loop feedback in FIG. 2 so that it may be unnecessary to sense either the contactor coil 14 voltage $V_{C(dc)}$ or current $I_{C(dc)}$. Furthermore, by providing an open loop, concerns with closed-loop stability can be reduced or, preferably, eliminated. Advantageously, this design improves both the practicality and the affordability of the voltage regulator 22.

Capacitor $C_7$ is also connected to pin 1 of the dual timer $U_1$, which discharges capacitor $C_7$ during the $T_{OFF}$ interval in preparation for the subsequent $T_{ON}$ interval. Zener diode $D_5$ acts as a clamp on the voltage across capacitor $C_7$ to ensure that the DC input voltage $V_O$ does not overcharge capacitor $C_7$, which may damage the dual timer $U_1$.

Pull-In Control Circuit

Contactors typically require a relatively large current to pull in the contactor armature initially and a relatively small current to maintain the contacts in a closed position during normal operation. The pull-in control circuit 34, which comprises the second half of the dual timer $U_1$, performs this function by modifying the operation of the constant off-time control circuit 32 for a brief time during start up. The pull-in control circuit 34 is a "one shot" or monostable circuit, which generates an output pulse having a duration corresponding to the time constant set by resistor $R_6$ and capacitor $C_6$. Before start up, capacitor $C_6$ has discharged due to the absence of the internal power supply voltage $V_{CC}$. When the AC supply voltage $v_{C(ac)}$ is first applied to the voltage regulator 22, capacitor $C_6$ behaves as a short circuit causing the trigger pin 8 to be pulled up to the internal power supply voltage $V_{CC}$. During this start up period, discharge pin 13 is low causing resistor $R_5$ and capacitor $C_5$ to be placed in parallel with the capacitor $C_7$, which increases the $C_7R_9$ time constant associated with the $T_{ON}$ interval. The normal duty cycle d of transistor $Q_2$ is made longer in proportion to the value of the capacitor $C_5$, which increases both the DC voltage $v_{C(dc)}$ applied to the contactor coil 14 and the contactor coil 14 current $i_{C(dc)}$. As capacitor $C_6$ is charged from the internal power supply voltage $V_{CC}$ through resistor $R_6$, the voltage applied to trigger pin 8 will eventually fall below one-third of the internal power supply voltage $V_{CC}$, which causes discharge pin 13 to become open circuited. As a result, exclusive control of the interval $T_{ON}$ is restored to the constant off-time control circuit 32 where the duration of $T_{ON}$ is determined by the DC input voltage $V_O$, and the time constant associated with resistor $R_9$ and capacitor $C_7$ as described hereinbefore.

Gate Driver Circuit

The current provided from pin 5 of dual timer $U_1$ may not be sufficient to drive the gate electrode of the switch circuit 26 transistor $Q_2$. In this circumstance, a gate driver circuit 36 can be used to generate the necessary current. As shown in FIG. 2, the gate driver circuit 36 preferably comprises transistors $Q_4$ and $Q_5$ and resistors $R_7$ and $R_{12}$, which form a totem-pole gate drive for transistor $Q_2$. For applications involving small contactors 15, a transistor having a relatively low current rating can be used to implement transistor $Q_2$ thereby allowing the gate driver circuit 36 to be eliminated to save cost.

Power Up Delay Circuit

The power up delay circuit 38 is used to ensure that the constant off-time control circuit 32 and the pull-in control circuit 34 do not begin operation until the internal power supply voltage $V_{CC}$ has stabilized. The collector terminal of transistor $Q_3$ is connected to the reset pins 4 and 10 of dual timer $U_1$. When the reset pins 4 and 10 are driven low, dual timer $U_1$ is disabled, which also disables the off-time control circuit 32 and the pull-in control circuit 34. Capacitor $C_4$ and resistor $R_4$ are used to delay activation of the dual timer $U_1$ during the start up interval after an AC supply voltage $v_{C(ac)}$ has been applied to the voltage regulator 22. Before start up, capacitor $C_4$ is discharged due to the absence of the internal power supply voltage $V_{CC}$. When the AC supply voltage $v_{C(ac)}$ is first applied to the voltage regulator 22, capacitor $C_4$ applies the internal power supply voltage $V_{CC}$ to the base of $Q_3$. This turns transistor $Q_3$ on, which drives its collector terminal low thereby disabling the dual timer $U_1$. The current into the base terminal of transistor $Q_3$ drops as capacitor $C_4$ charges. Eventually, the voltage across capacitor $C_4$ rises to the internal power supply voltage $V_{CC}$ level at a rate controlled by the time constant $R_4 C_4$. As the voltage developed across capacitor $C_4$ increases, the base current into transistor $Q_3$ decreases until it eventually drops to zero and transistor $Q_3$ is turned off. When transistor $Q_3$ is turned off, there is no voltage drop across resistor $R_3$ thus driving the collector terminal of $Q_3$ high and enabling operation of the dual timer $U_1$.

Preferred embodiments of each of the circuit blocks of FIG. 2 have been discussed. It will be understood, however, that many other circuit designs may be used for each of these blocks. Moreover, one or more of the blocks need not be included.

Component Values

Table I set forth hereafter provides component values for six embodiments of the electrical contactor power supply system 20. These embodiments were developed as prototypes for experimental laboratory testing, experimental field trials, or both. As demonstrated by the entries in Table I, a near universal design can be used for a variety of contactors.

TABLE I

COMPONENT VALUES

| | Laboratory Tests | | Field Trials | | | |
|---|---|---|---|---|---|---|
| | No. 1 NEMA 2 Square D | No. 2 NEMA 3 Westinghouse | No. 3 NEMA 4 Square D | No. 4 NEMA 4 Furnas | No. 5 Control Relay Square D | Both No. 6 IECA to C |
| $R_1$ | | | 910 kΩ | | | |
| $R_2$ | | | 150 kΩ | | | |
| $R_3$ | | | 100 kΩ | | | |
| $R_4$ | | | 274 kΩ | | | |
| $R_5$ | | | 1 MΩ | | | |
| $R_6$ | | | 200 kΩ | | | |
| $R_7$ | | | 10 kΩ | | | |
| $R_8$ | | | 100 kΩ | | | |
| $R_9$ | | | 100 kΩ ½ W | | | |
| $R_{10}$ | | | 18 kΩ | | | |
| $R_{11}$ | | | 100 kΩ | | | |
| $R_{12}$ | | | 12 kΩ | | | |
| $C_1$ | | 43 μF | | | 22 μF | 33 μF |
| $C_2$ | | | 0.22 μF | | | |
| $C_3$ | | | 10 μF | | | |
| $C_4$ | | | 0.1 μF | | | |
| $C_5$ | | | 5.6 nF | | | |
| $C_6$ | | 0.47 μF | 0.33 μF | | 0.47 μF | |
| $C_7$ | | 100 pF | 27 pF | | 100 pF | |
| $C_8$ | 560 pF | 820 pF | 470 pF | 220 pF | 330 pF | 470 pF |
| $C_9$ | | | 0.1 μF | | | |
| $D_1$ | | | 16 V Zener, 0.5 W | | | |
| $D_2$ | | | 1N914 - low leakage | | | |
| $D_3$ | | | HBR 105, 400 V, 1 A, $t_{TT}$ = 50 ns | | | |
| $D_4$ | | | 15 V Zener | | | |
| $D_5$ | | | 15 V Zener | | | |
| MOV | | | 130 VAC | | | |
| $Q_1$ | | | FZT658CT NPN, 400 V, 0.5 A | | | |
| $Q_2$ | | | NTB2374, 200V, 18A, $r_{ds(on)}$ = 0.18Ω | | | |
| $Q_3$ | | | 2N3904 | | | |
| $Q_4$ | | | 2N3904 | | | |
| $Q_5$ | | | 2N3906 | | | |
| $U_1$ | | | Harris, ICM7556 IPD | | | |
| $U_2$ | | | Bridge Rectifier, 700 V, 1 A | | | |

Laboratory Test Results

A series of experimental tests were performed on different prototype embodiments of the electrical contactor power supply 20 to observe the behavior under AC supply voltage sags and complete dropouts. Specifically, three prototype designs corresponding to Nos. 1, 2, and 6 from Table I were subjected to laboratory testing. The test results for design No. 6 in which an International Electrotechnical Commission IEC-C contactor was used will now be described.

The test environment included a signal generator and a power amplifier to provide the AC supply voltage $v_{C(ac)}$. The signal generator was programmed to provide sags and dropouts of varying degree and duration. A Tektronix 11401 digitizing oscilloscope was used to capture time waveforms of various signals, which were transferred to a computer over an IEEE-488 bus and plotted in a graphical format. Several of these signal graphs are included herein as FIGS. 3A–3B, 4A–4D, 5A–5D, and 6A–6D.

Figure 3A:
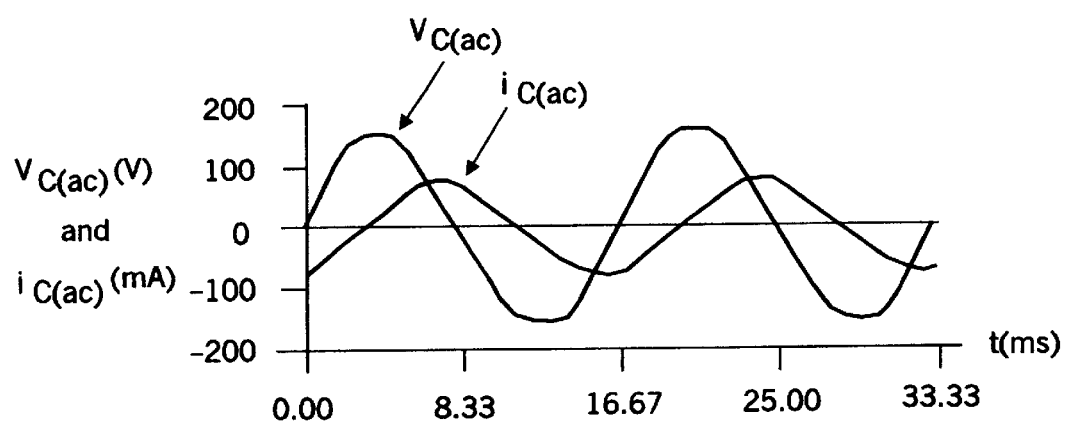
FIG. 3A is a graph of an AC voltage source and current drawn by a coil for the conventional electrical contactor power supply of FIG. 1A.
Figure 3B:
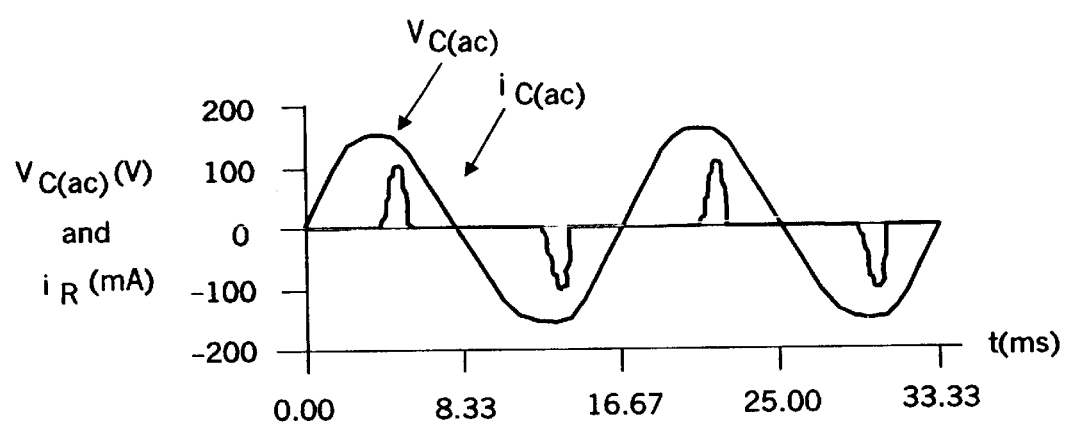
FIG. 3B is a graph of an AC voltage source and current drawn by a voltage regulator for the electrical contactor power supply of FIG. 1B.

Referring now to FIG. 3A, two cycles of both the contactor coil 14 voltage $v_{C(ac)}$ and current $i_{C(ac)}$ are shown for the configuration of FIG. 1A in which the AC supply voltage $v_{C(ac)}$ is connected directly to the contactor coil 14 without using the voltage regulator 22. FIG. 3B shows the AC supply voltage $v_{C(ac)}$ and voltage regulator 22 current $i_R$ when the voltage regulator 22 is used as shown in FIG. 1B. Note that the voltage regulator 22 current $i_R$ is nonsinusoidal due to the action of the full-wave bridge rectifier $U_2$ in the rectifier circuit 24 (see FIG. 2). Table II shows a comparison of the peak and RMS values of $i_{C(ac)}$ and $i_R$ from FIGS. 3A and 3B.

TABLE II

CONTACTOR COIL CURRENT COMPARED WITH VOLTAGE REGULATOR CURRENT

|  | Coil - $i_{C(ac)}$ (mA) | Regulator - $i_R$ (mA) |
| --- | --- | --- |
| RMS value | 53 | 30 |
| Peak value | 85 | 105 |

While the peak value of $i_R$ is greater than the peak value of $i_{C(ac)}$, the RMS value of $i_R$ is only 60% of the RMS value of $i_{C(ac)}$. Therefore, based on these results, the addition of the voltage regulator 22 may reduce the volt-amperes (VA) required to operate the contactor coil 14.

Although not systematically investigated, the transient performance of the conventional electrical contactor power supply system shown in FIG. 1A was evaluated and found to be sensitive to minor sags and dropouts in the AC supply voltage lasting two to three cycles. Accordingly, the need for an electrical contactor power supply system in accordance with the present invention is apparently well justified.

Figure 4A:
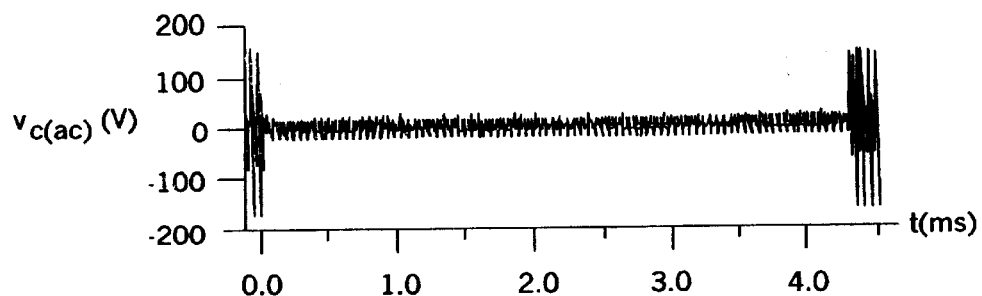
FIGS. 4A–4D are graphs of specific voltage and current signals that depict an operation of the electrical contactor power supply of FIG. 1B in response to a 90% sag in the AC supply voltage.
Figure 4B:
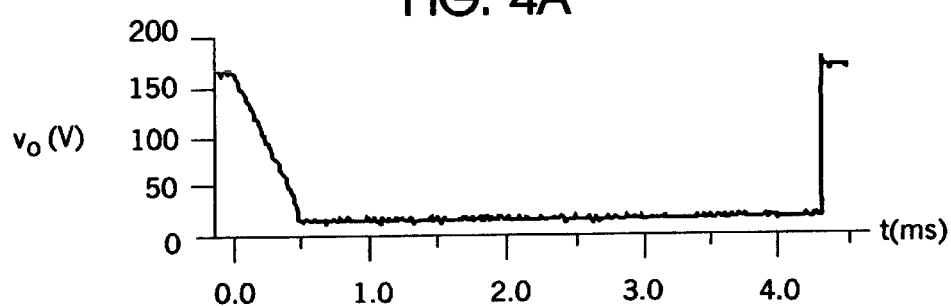
Figure 4C:
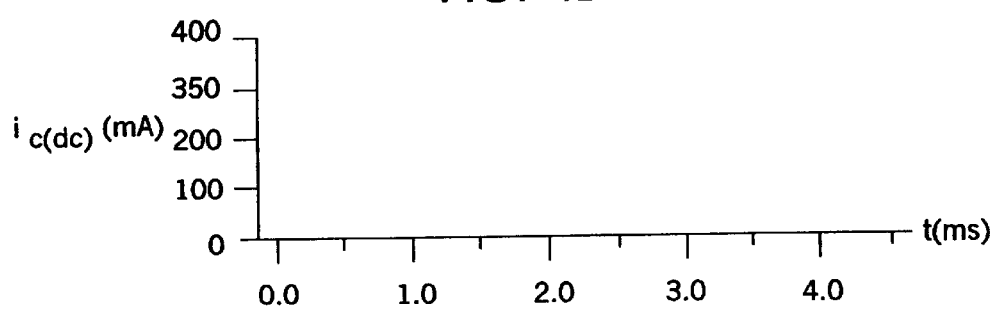
Figure 4D:
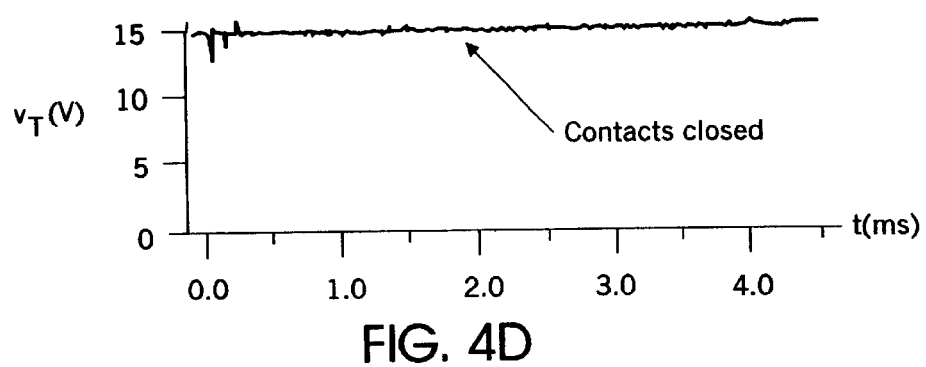

The remainder of the laboratory transient performance testing was performed with the voltage regulator 22 installed as shown in FIG. 1C. FIGS. 4A–4D show the contactor coil 14 operation when the AC supply voltage $v_{C(ac)}$ sags to 10% of its steady state level for a duration of approximately 4.2 seconds. The sag in the AC supply voltage $v_{C(ac)}$ is shown in FIG. 4A where $V_{C(ac)}$ drops from 120V to 12V. The DC input voltage $v_O$ developed across energy storage capacitor $C_1$ takes about 0.5 seconds to decay from its initial value of approximately 170 V down to 17 V as shown in FIG. 4B. Despite the ten-to-one reduction in the AC supply voltage $v_{C(ac)}$, FIG. 4C shows that the DC current $i_{C(dc)}$ through the contactor coil 14 remains substantially constant. Referring now to FIG. iC, the voltage drop $v_T$ across resistor $R_T$ can be measured to determine the status of the contacts 16. Accordingly, FIG. 4D shows the test signal $v_T$ remaining stable at approximately 15V, which indicates that the contacts 16 remained closed during this transient voltage sag. Although the AC supply voltage $v_{C(ac)}$ is restored after approximately 4.2 seconds, the contactor 15 can operate indefinitely at the reduced voltage.

This test highlights the ability of the electrical contactor power supply system 20 to maintain the contactor coil 14 current $i_{C(dc)}$ despite a 90% drop in the AC supply voltage $V_{C(ac)}$. Nevertheless, such a wide operability range may not be desirable in all cases. The minimum AC source voltage value $V_{C(ac)-min}$ and the corresponding DC input voltage value $V_{O-min}$, obtained from Equation 7, for which the voltage regulator 22 indefinitely maintains the contactor coil 14 current $i_{C(dc)}$ are set by resistor $R_{10}$ of the internal power supply circuit 28. Increasing the value of resistor $R_{10}$ increases $V_{C(ac)-min}$ and $V_{O-min}$ by preventing the internal power supply circuit 28 from producing the internal power supply voltage $V_{CC}$. Referring again to FIG. 2, increasing the value of resistor $R_{10}$ results in a larger voltage drop between the DC input voltage $v_O$ and the collector terminal of transistor $Q_1$. If the voltage drop across resistor $R_{10}$ is too great, the voltage at the emitter terminal of transistor $Q_1$ may be too small to generate a sufficient voltage level for the internal power supply voltage $V_{CC}$. As a result, the constant off-time control circuit 32 and the pull-in control circuit 34 will be disabled through the disabling of the dual timer $U_1$, which turns transistor $Q_2$ off in the switch circuit 26.

Figure 5A:
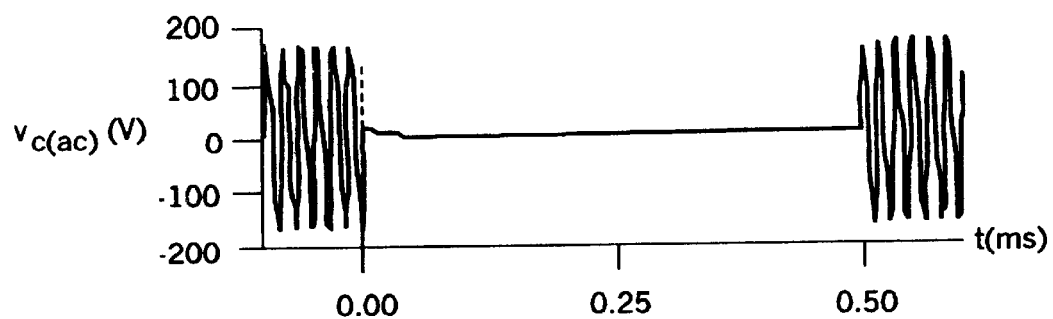
FIGS. 5A–5D are graphs of specific voltage and current signals that depict an operation of the electrical contactor power supply of FIG. 1B in response to a dropout in the AC supply voltage lasting one-half second.
Figure 5B:
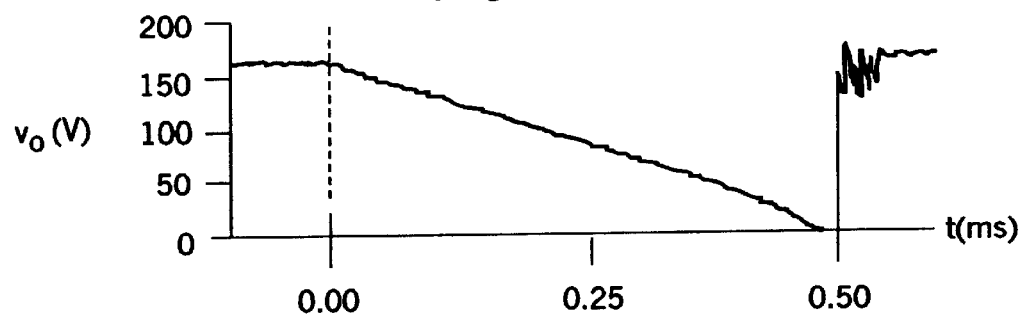
Figure 5C:
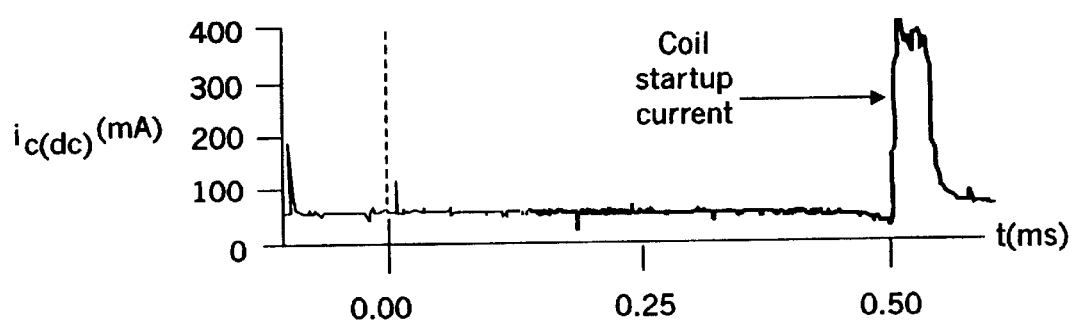
Figure 5D:
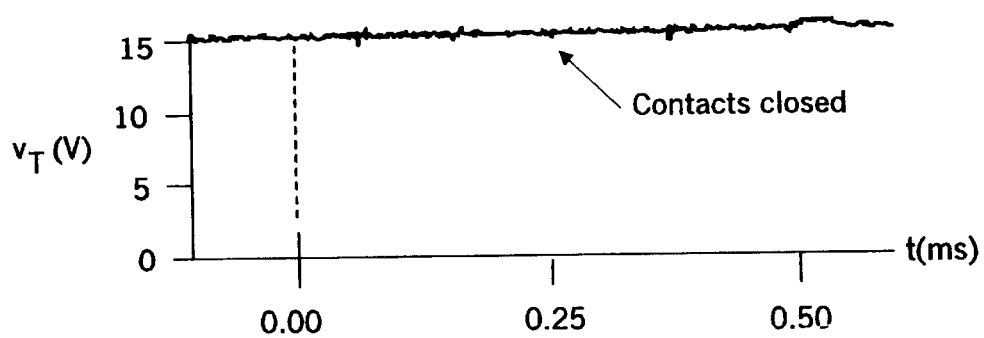

FIGS. 5A–5D show a complete dropout of the AC supply voltage $v_{C(ac)}$ lasting approximately 0.5 seconds. FIG. 5A shows the AC supply voltage $v_{C(ac)}$ dropping to zero and then reappearing after approximately 0.5 seconds. FIG. 5B shows the DC input voltage $v_O$ across the energy storage capacitor $C_1$ decaying due to the absence of the AC supply voltage $v_{C(ac)}$ and the current drain into the contactor coil 14. FIG. 5C shows that the voltage regulator 22 maintains the contactor coil 14 current $i_{C(dc)}$ for almost the entire 0.5 seconds. In addition, FIG. 5C illustrates the operation of the pull-in control circuit 34, which is triggered at approximately the 0.5 second mark when the AC supply voltage $v_{C(ac)}$ is restored. Specifically, the pull-in control circuit 34 causes an increase in contactor coil 14 current $i_{C(dc)}$ to close the contactor armature, which, in this specific example, is not necessary because the voltage regulator 22 was able to maintain the contactor coil 14 current $i_{C(dc)}$ throughout the dropout. FIG. 5D shows that the contacts 16 remained closed during the 0.5 second dropout.

For given values of the minimum AC supply voltage $V_{C(ac)-min}$ and the minimum DC input voltage $V_{O-min}$, the energy storage capacitor $C_1$ directly sets the duration of the dropout through which the voltage regulator 22 can keep the contacts 16 closed. Doubling the value of $C_1$ doubles the ride-through time while halving the value of $C_1$ halves the ride-through time.

Figure 6A:
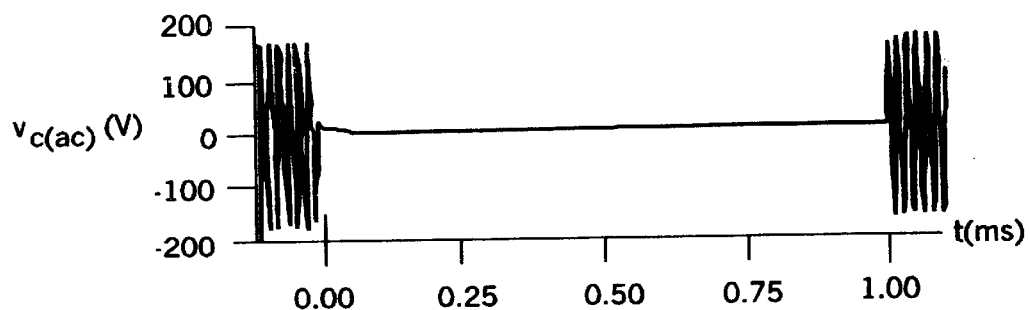
FIGS. 6A–6D are graphs of specific voltage and current signals that depict the operation of an electrical contactor power supply of FIG. 1B in response to a dropout in the AC supply voltage lasting one second.
Figure 6B:
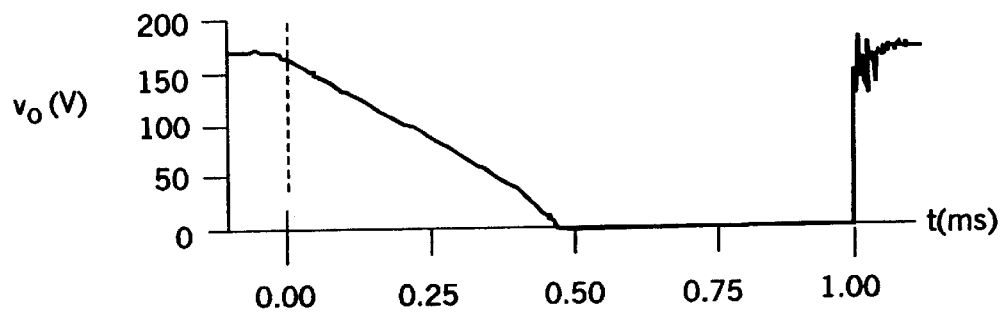
Figure 6C:
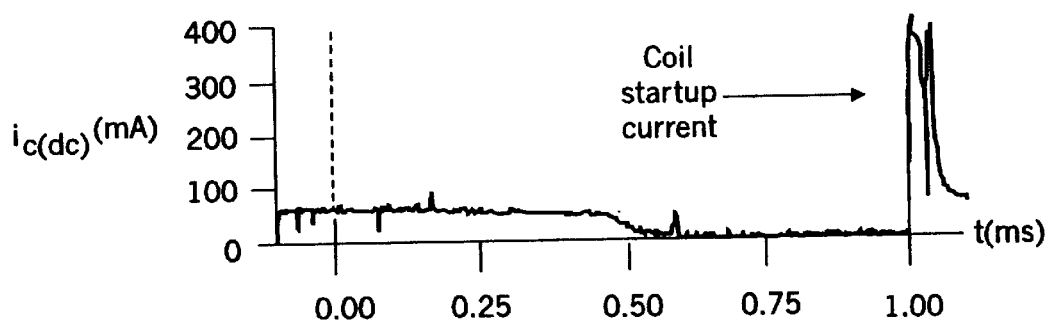
Figure 6D:
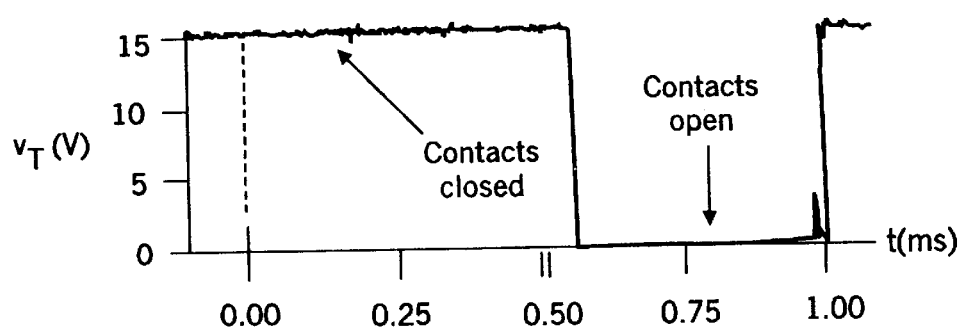

FIGS. 6A–6D show a complete dropout of the AC supply voltage $v_{C(ac)}$ lasting approximately 1.0 second. FIG. 6A shows the AC supply voltage $v_{C(ac)}$ dropping to zero and then reappearing after approximately 1.0 second. FIG. 6B shows the DC input voltage $v_O$ dropping to zero as capacitor $C_1$ is completely discharged. FIG. 6C shows the voltage regulator 22 maintaining the coil current $i_{C(dc)}$ for as long as the DC input voltage $v_O$ is available at an adequate magnitude. Finally, the contacts 16 open or drop out as shown in FIG. 6D.

FIGS. 6A–6D also show the waveforms that occur upon startup of the voltage regulator 22 at the end of the one second dropout. The DC input voltage $v_O$ across energy storage capacitor $C_1$ rises to the peak value of $v_{C(ac)}$ (see FIG. 6B) and the contactor coil 14 startup current closes the contacts 16 (see FIG. 6C).

As stated in the foregoing, a small IEC-C contactor was used to generate the test waveforms of FIGS. 3B, 4A–4D, 5A–5D, and 6A–6D. Much larger contactors-a Square D NEMA 2 and a Westinghouse NEMA 3-were used in longer-term laboratory tests using the designs identified in Table I as No. 1 and No. 2. While a rigorous long-term reliability study has not yet been completed, these designs were used to study the possibility of "infant mortality" failures. The voltage regulators and associated contactors were operated continuously for about a month in an unventilated metal enclosure that was approximately one foot on each side. No failures occurred during these tests.

Field Trial Test Results

In addition to the laboratory testing, several embodiments of the electrical contactor power supply system 20 were also subjected to experimental testing in a field setting. A plant had been experiencing repeated shut down of refrigeration equipment located at the end of a distribution feeder due to contactor dropout. The contactors control a refrigerator compressor motor that must be in continuous operation. Loss of refrigeration for only 15 to 20 minutes may cause the refrigerator temperature to exceed an acceptable limit resulting in a substantial loss of product. This was a problem during normal work hours because the plant engineer had to continually restart the compressors manually. The problem was even worse outside of normal work hours because the plant engineer had to be called in from home to restart the compressors.

A field trial of the electrical contactor power supply system 20 was initiated to evaluate the efficacy of the electrical contactor power supply system 20 in combating this problem. The installation proceeded in two phases: For the first installation, voltage regulators were designed and fabricated for one Square D NEMA 4 contactor and four Square D control relays. These designs are identified in Table I as No. 3 and No. 5, respectively. These voltage regulators were designed to ride-through a power line disturbance lasting one second. Two of the relay coils were connected in parallel and could be served by one voltage regulator, while the remaining two relay coils were each served by a dedicated voltage regulator.

Figure 7A:
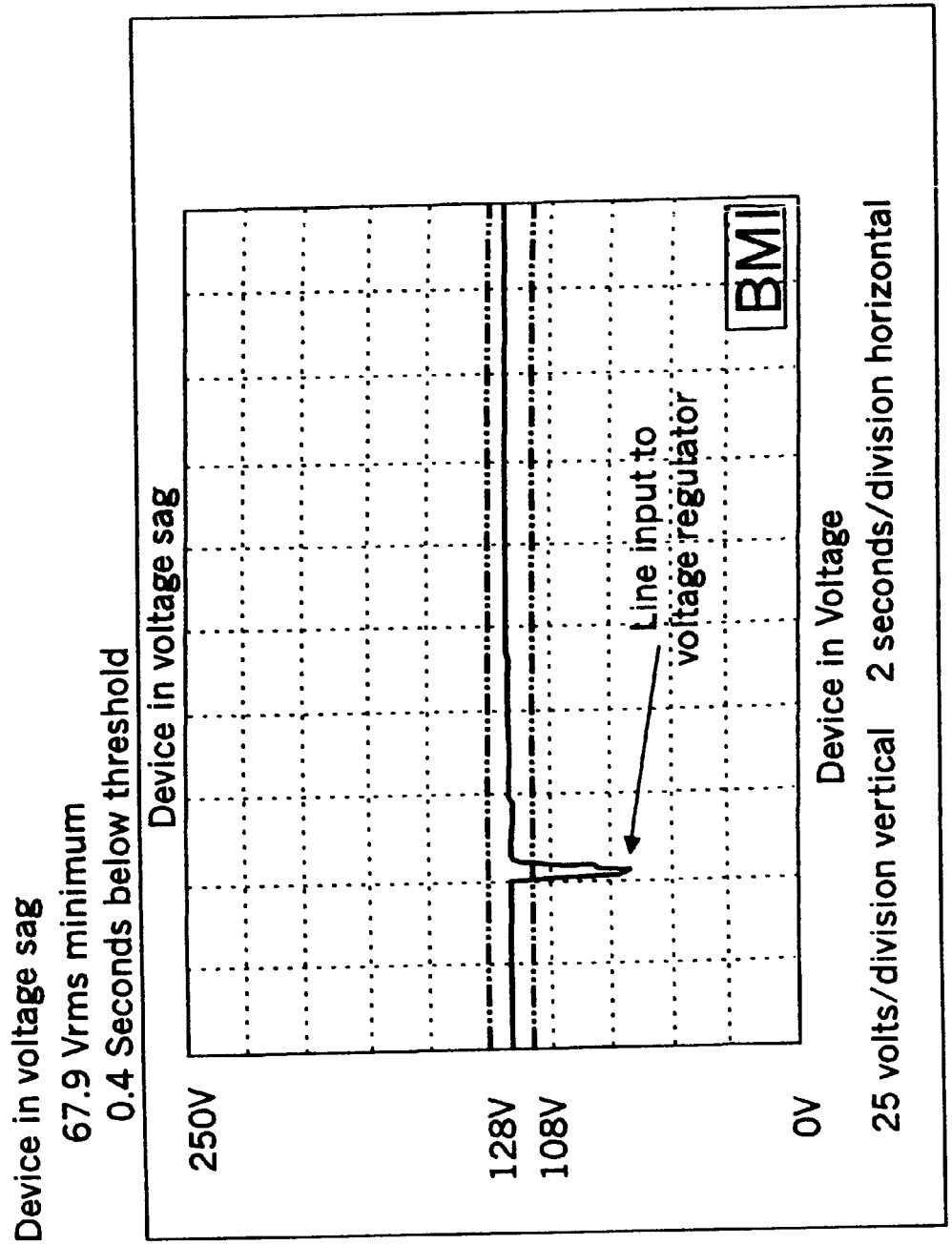
FIGS. 7A–7B are graphs of an AC voltage source and the voltage provided to a machine through an electrical contactor power supply of FIG. 1B collected from an experimental field trial.
Figure 7B:
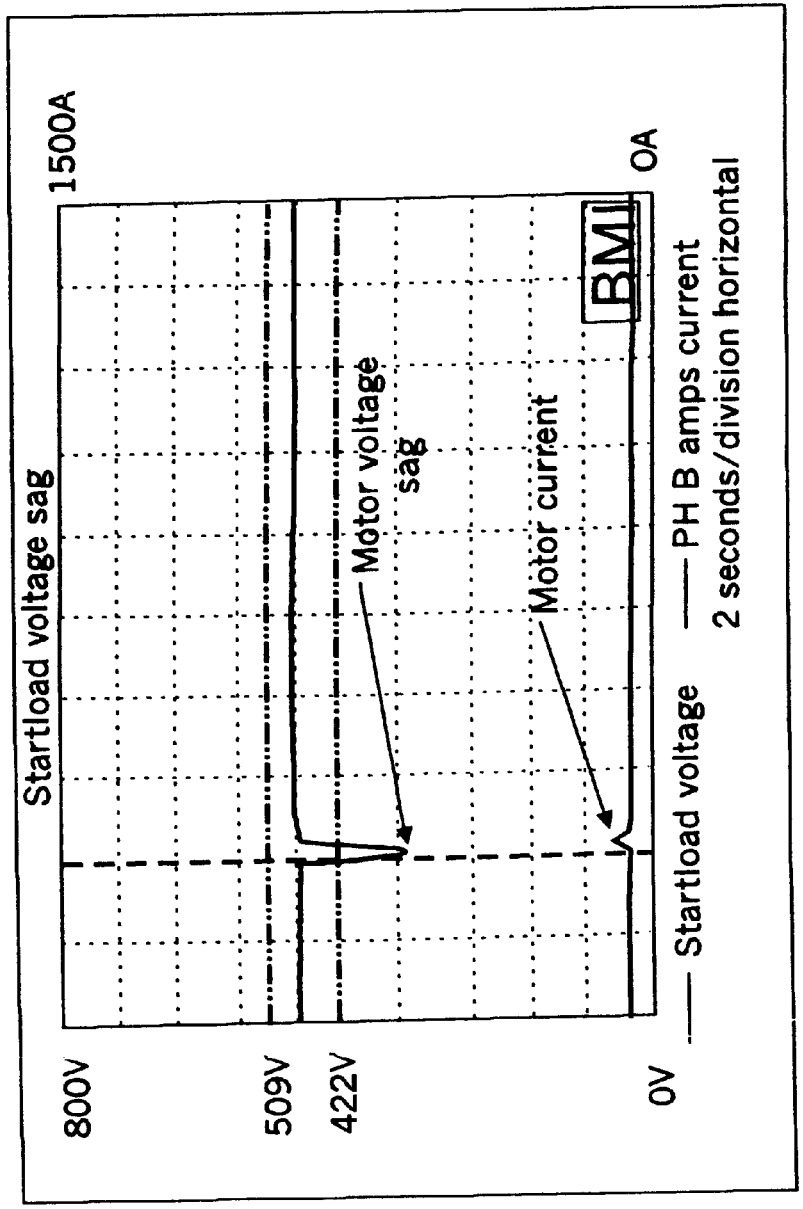

A BMI 8800 was installed to monitor the nominal 120V AC supply voltage to the voltage regulator, the nominal 480V supply to the motor, and the current in phase-B of the motor. Numerous power line disturbances were captured during the trial. FIG. 7A shows the voltage applied to the contactor coil for a representative event. Starting from a nominal 120V, the contactor coil voltage sagged to approximately 70 V for a duration of approximately 0.4 seconds. FIG. 7B shows the voltage applied to the motor and the phase-B motor current. The voltage applied to the motor experienced a sag proportional to the voltage applied to the contactor coil. During this event, the motor current sagged with the voltage and then surged slightly as the AC supply voltage was restored. The refrigeration continued to operate normally during this sag. By comparison, this sag disrupted the operation of every other piece of electrical equipment in the plant, including the computing equipment.

The voltage regulators solved the problem with contactor dropout on the refrigerator compressor motors. Due to the success of the first installation, the field trial was expanded with a second installation. The first installation was replicated for two additional refrigerator compressor motors for a total of three.

Contactor dropout was also a problem on a motor driving an air compressor. To address this problem, voltage regulators were designed for a Fumas NEMA 4 contactor, an IEC-C contactor, and an additional Square D control relay, identified in Table I as designs No. 4, No. 5, and No. 6, respectively. The voltage regulators performed as desired. Unfortunately, the electronic device operating the control relay was subject to dropout as well. This experience demonstrates that generally every control device in the chain must be able to ride-through the line disturbances for the electrical contactor power supply system to be effective.

A decision was made not to pursue the air compressor problem and the voltage regulators were subsequently removed. The voltage regulators installed on the contactors for the refrigerator compressor motors remain in operation for long term evaluation of their performance.

The principles of the invention have been illustrated herein as they are applied to an electrical contactor power supply system that includes a voltage regulator. From the foregoing, it can readily be seen that the electrical contactor power supply systems and methods can solve an important piece of the power quality puzzle by addressing the problem of contactor ride-through. The voltage regulator can be mechanically compatible with many contactors and may be easily retrofitted into existing installations. In addition, very small circuit changes may be needed to adapt the voltage regulator to a variety of contactor coils.

It should be understood, however, that the electrical contactor power supply system could cause a hazard if installed in the wrong location. For example, inasmuch as the voltage regulator introduces a delay in the operation of the contactor, the electrical contactor power supply system should be installed only on equipment designed for continuous operation and not on equipment where this time delay could be dangerous. It is envisioned, however, that the electrical contactor power supply could be modified to include an emergency stop button that opens the contactor immediately.

It must also be noted that concerns have also been expressed about the possibility of motor damage caused by holding the contactor closed during a power line disturbance. While no damage has been observed so far during the field trial discussed above, the possibility of accumulated damage appearing in the future cannot be discounted. Nevertheless, the cost of replacing a motor every few years may be inconsequential compared to the cost of lost production over that same time period.

In concluding the detailed description, it should be noted that many variations and modifications can be made to the preferred embodiments without substantially departing from the principles of the present invention. All such variations and modifications are intended to be included herein within the scope of the present invention, as set forth in the following claims.

We claim:

1. A power supply system, comprising:
   means for converting an alternating current supply voltage to a direct current input voltage;
   means for supplying the direct current input voltage to an electromagnetic device such that the electromagnetic device operates from the direct current input voltage; and
   means for storing at least some of the direct current input voltage, the means for supplying being responsive to the means for storing and to reduction of the alternating current supply voltage, to supply the direct current input voltage so stored to the electromagnetic device for a period of time, such that the electromagnetic device operates from the direct current unput voltage so stored, notwithstanding the reduction of the alternating current supply voltage.

2. A power supply system as recited in claim 1, wherein the electromagnetic device is an electrical contactor.

3. A power supply system as recited in claim 1, wherein the means for storing comprises a capacitor.

4. A power supply system as recited in claim 1, wherein the reduction of the alternating current supply voltage comprises dropout of at least a portion of an alternating current cycle of the alternating current supply voltage.

5. A power supply system as recited in claim 2, wherein the means for converting comprises a rectifier.

6. A power supply system as recited in claim 2, wherein the means for supplying comprises:
   means for generating a periodic control signal having a first state and a second state such that, in a single cycle of the periodic control signal, a ratio of time in the first state to time in both of the first and the second states is related to a magnitude of the direct current input voltage;

means for electrically connecting the direct current input voltage to the electrical contactor when the periodic control signal is in the first state; and means for electrically disconnecting the direct current input voltage from the electrical contactor when the periodic control signal is in the second state.

7. An electrical contactor system, comprising:

an electrical contactor;

means for converting an alternating current supply voltage to a direct current input voltage;

means for supplying the direct current input voltage to the electrical contactor such that the electrical contactor operates from the direct current input voltage; and means for storing at least some of the direct current input voltage, the means for supplying being responsive to the means for storing and to reduction of the alternating current supply voltage, to supply the direct current input voltage so stored to the electrical contactor for a period of time, such that the electrical contactor operates from the direct current input voltage so stored, notwithstanding the reduction of the alternating current supply voltage.

8. An electrical contactor system as recited in claim 7, further comprising:

a machine that is electrically connected to the electrical contactor;

wherein the electrical contactor is further connected to the alternating current supply voltage such that the electrical contactor electrically connects the machine to the alternating current supply voltage when the direct current input voltage is supplied to the electrical contactor.

9. An electrical contactor system as recited in claim 7, wherein the means for storing comprises a capacitor.

10. An electrical contactor system as recited in claim 7, wherein the reduction of the alternating current supply voltage comprises dropout of at least a portion of an alternating current cycle of the alternating current voltage.

11. An electrical contactor system as recited in claim 7, wherein the means for converting comprises a rectifier.

12. A power supply system, comprising:

a rectifier that generates a direct current input voltage in response to an alternating current supply voltage;

an interface circuit that supplies the direct current input voltage to an electromagnetic device such that the electromagnetic device operates from the direct current input voltage; and an energy storage device that stores at least some of the direct current input voltage, the interface circuit being responsive to the energy storage device and to reduction of the alternating current supply voltage, to supply the direct current input voltage so stored to the electromagnetic device for a period of time, such that the electromagnetic device operates from the direct current input voltage so stored, notwithstanding the reduction of the alternating current supply voltage.

13. A power supply system as recited in claim 12, wherein the electromagnetic device is an electrical contactor.

14. A power supply system as recited in claim 12, wherein the energy storage device comprises a capacitor.

15. A power supply system as recited in claim 12, wherein the reduction of the alternating current supply voltage comprises dropout of at least a portion of an alternating current cycle of the alternating current supply voltage.

16. A power supply system as recited in claim 13, wherein the interface circuit comprises;

a timer that generates a periodic control signal having a first state and a second state such that, in a single cycle of the periodic control signal, a ratio of time in the first state to time in both of the first and the second states is related to a magnitude of the direct current input voltage;

a switch that electrically connects the direct current input voltage to the electrical contactor when the periodic control signal is in the first state and that electrically disconnects the direct current input voltage from the electrical contactor when the periodic control signal is in the second state.

17. A method of supplying electrical power, comprising the steps of:

converting an alternating current supply voltage to a direct current input voltage;

supplying the direct current input voltage to an electromagnetic device such that the electromagnetic device operates from the direct current input voltage; and storing at least some of the direct current input voltage, the supplying step being responsive to the storing step and to reduction of the alternating current supply voltage, to supply the direct current input voltage so stored to the electromagnetic device for a period of time, such that the electromagnetic device operates from the direct current input voltage so stored, notwithstanding the reduction of the alternating current supply voltage.

18. A method as recited in claim 17, wherein the electromagnetic device is an electrical contactor.

19. A method as recited in claim 17, wherein the reduction of the alternating current supply voltage comprises dropout of at least a portion of an alternating current cycle of the alternating current supply voltage.

20. A method as recited in claim 18, wherein the supplying step comprises the steps of:

generating a periodic signal having a first state and a second state such that, in a single cycle of the periodic control signal, a ratio of time in the first state to time in both of the first and the second states is related to a magnitude of the direct current input voltage;

electrically connecting the direct current input voltage to the electrical contactor when the periodic control signal is in the first state; and electrically disconnecting the direct current input voltage from the electrical contactor when the control signal is in the second state.

21. A power supply system, comprising:

means for converting an alternating current supply voltage to a direct current input voltage;

means for generating a periodic control signal having a first state and a second state such that, in a single cycle of the periodic control signal, a ratio of time in the first state to time in both of the first and the second states is related to a magnitude of the direct current input voltage;

means for electrically connecting the direct current input voltage to an electromagnetic device when the periodic control signal is in the first state; and means for electrically disconnecting the direct current input voltage from the electromagnetic device when the periodic control signal is in the second state.

22. A power supply system as recited in claim 21, further comprising:

means for storing at least some of the direct current input voltage, the means for supplying being responsive to the means for storing and to reduction of the alternating current supply voltage, to supply the direct current input voltage so stored to the electromagnetic device for a period of time, such that the electromagnetic device operates from the direct current input voltage so stored, notwithstanding the reduction of the alternating current supply voltage.

23. An electrical contactor system, comprising:

an electrical contactor;

means for converting an alternating current supply voltage to a direct current input voltage;

means for generating a periodic control signal having a first state and a second state such that, in a single cycle of the periodic control signal, a ratio of time in the first state to time in both of the first and the second states is related to a magnitude of the direct current input voltage;

means for electrically connecting the direct current input voltage to the electrical contactor when the periodic control signal is in the first state; and means for electrically disconnecting the direct current input voltage from the electrical contactor when the periodic control signal is in the second state.

24. An electrical contactor system as recited in claim 23, further comprising:

means for storing at least some of the direct current input voltage, the means for supplying being responsive to the means for storing and to reduction of the alternating current supply voltage, to supply the direct current input voltage so stored to the electrical contactor for a period of time, such that the electrical contactor operates from the direct current input voltage so stored, notwithstanding the reduction of the alternating current supply voltage.

25. A power supply system, comprising:

a rectifier that generates a direct current input voltage in response to an alternating current supply voltage;

a timer that generates a periodic control signal having a first state and a second state such that, in a single cycle of the periodic control signal, a ratio of time in the first state to time in both of the first and the second states is related to a magnitude of the direct current input voltage; and a switch that electrically connects the direct current input voltage to an electromagnetic device when the periodic control signal is in the first state and that electrically disconnects the direct current input voltage from the electromagnetic device when the periodic control signal is in the second state.

26. A power supply system as recited in claim 25, further comprising:

an energy storage device that stores at least some of the direct current input voltage, the interface circuit being responsive to the energy storage device and to reduction of the alternating current supply voltage, to supply the direct current input voltage so stored to the electromagnetic device for a period of time, such that the electromagnetic device operates from the direct current input voltage so stored, notwithstanding the reduction of the alternating current supply voltage.

27. A method of supplying electrical power, comprising the steps of:

converting an alternating current supply voltage to a direct current input voltage;

generating a periodic signal having a first state and a second state such that, in a single cycle of the periodic control signal, a ratio of time in the first state to time in both of the first and the second states is related to a magnitude of the direct current input voltage; and electrically connecting the direct current input voltage to the electromagnetic device when the periodic control signal is in the first state; and electrically disconnecting the direct current input voltage from the electromagnetic device when the periodic control signal is in the second state.

28. A method of supplying electrical power as recited in claim 27, further comprising the step of:

storing at least some of the direct current input voltage, the supplying step being responsive to the storing step and to reduction of the alternating current supply voltage, to supply the direct current input voltage so stored to the electromagnetic device for a period of time, such that the electromagnetic device operates from the direct current input voltage so stored, notwithstanding the reduction of the alternating current supply voltage.

* * * * *